United States Patent Office 3,184,301
Patented May 18, 1965

3,184,301
METHOD FOR DESTROYING WEEDS
Henry Martin, Basel, and Hans Aebi, Riehen, Switzerland, assignors to Ciba Limited, Basel, Switzerland, a Swiss company
No Drawing. Original application Aug. 29, 1960, Ser. No. 52,374. Divided and this application Nov. 9, 1962, Ser. No. 246,847
Claims priority, application Switzerland, Sept. 3, 1959, 77,754
6 Claims. (Cl. 71—2.6)

This is a division of application Serial No. 52,374, filed Aug. 29, 1960, now abandoned.

Thompson et al. (Bot. Gaz. Vol. 107 (1946), page 475) were the first to describe the value of various substituted ureas as herbicides. Bucha and Todd (Science 1949, vol. 114, No. 2967, page 493) have recognized that N-4-chlorophenyl-N':N'-dimethyl-urea possesses a herbicidal action. Arising out of these two disclosures considerably more than 1000 urea derivatives have been synthesized and tested for their herbicidal activity (Chem. & Ind. 1957, page 1106). Moreover, a very wide variety of preparations which contain urea or thiourea derivatives have been described in numerous patent specifications.

The present invention is based on the unexpected observation that aromatic carbamic acid amides which correspond to the general formula

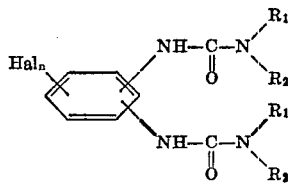

possess a herbicidal activity. In the above formula Hal represents a halogen atom, more especially a chlorine atom, $R_1$ represents a hydrogen atom or a lower alkyl group, more especially a methyl or ethyl group, and $R_2$ represents a lower alkyl group, more especially a methyl or ethyl group and $n$ is the whole number 1 or 2.

It is surprising that the urea derivatives of the above formula should be active and distinguished from other aromatic bis-carbamic acid amides. Thus, for example, it has been found that diphenyl-methane-4:4'-bis-N':N'-dialkylureas, for example diphenylmethane-4':4'-bis-(N':N'-dimethyl-urea), N:N'-piperazine-bis-(4-chlorophenyl-urea), and N:N' - piperazine-bis - (3:4 - dichlorophenyl-urea) possess no herbicidal activity. Moreover, derivatives very closely comparable with the aromatic carbamic acid amides of the above general formula, such as 1-methyl-2:4-phenyl-bis-(N':N'-dimethyl-urea), possess no herbicidal activity, whereas 1-chloro-2:4-phenyl-bis-(N':N'-dimethyl-urea) exhibits strongly phytotoxic properties. As compared with other urea derivatives known to be herbicides, the compound of the above general formula are distinguished by their good solubility in water.

The compounds can be made by methods known for making urea derivatives. An especially suitable method for making the aromatic bis-carbamic acid amides of the above formula is to react a halogen-substituted aromatic di-isocyanate, for example, 1-chlorophenyl-2:4-di-isocyanate, with an aliphatic amine or amines, for example, monomethylamine, monoethylamine, dimethylamine, methyl-ethylamine, methyl-propylamine or methyl-n-butylamine. Alternatively, the aforesaid carbamic acid amides can be made by reacting a halogen-substituted phenyl diamine with an aliphatic carbamic acid derivative or derivatives, such as a halide or phenol ester carbamic acid, chloride or methylisocyanate. The following are examples of compounds of the above general formula:

(1) 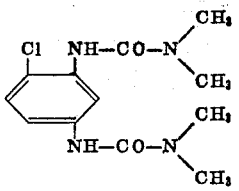

(2) 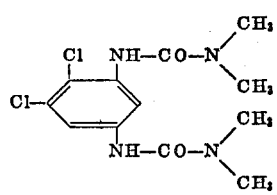

(3) 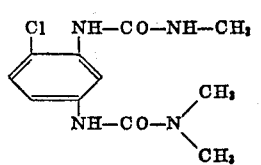

(4) 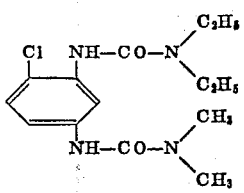

(5) 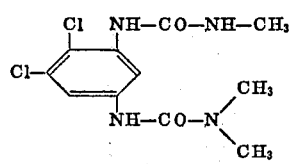

The invention also provides herbicidal preparations which contain a compound of the above general formula as active substance, the active substance may be in solution or in an emulsified or dispersed form, or in the form of a dusting preparation, alone or in admixture with another herbicidal compound, for example, a tri- or tetra-substituted aryl-alkyl-urea, a halogenated phenoxyalkane carboxylic acid, a halogenated benzoic acid, or phenyl acetic acid, a halogenated fatty acid or a salt, ester or amide of such acid, or with borax or other inorganic salt, such as a abraum salt, or calcium cyanamide, urea or other fertilizer, or an insecticide, for example, such as a chlorinated hydrocarbon or a phosphoric acid ester. Active substances having a basic reaction are also suitable, such as tertiary or quaternary amines having a herbicidal action, for example, dodecyl-hexamethyleneimine or a salt thereof, or 1:1'-ethylene-2:2'-dipyridilium dibromide. There may also be incorporated with the preparations of this invention herbicidally active carbamates or thiol-carbamates or dithiocarbamic acid esters or derivatives of s-triazone. There may also be incorporated herbicidally active heterocyclic compounds, for example, 2-chloro-benzthiazole, 3-amino-1:2:4-triazole, maleic acid hydrazide, 3:5-dimethyl-tetrahydro-1:3:5:2:4-thiadiazine-2-thione, or simpler herbicidal substances, such as pentachlorophenol, dinitrocresol, dinitro - butylphenol, naphthyl-phthalaminic acid or methyl isocyanate.

For making solutions to be used for spraying as such there are used, for example, mineral oil fractions of high to medium boiling range such as diesel oil or kerosene or coal tar oils or oils of vegetable or animal origin, or hydrocarbons such as alkylated naphthalenes or tetrahydronaphthalene, if desired, together with xylene mixtures, cyclohexanols, ketones or chlorinated hydrocarbons, such as tetrachlorethane, trichlorethylene or tri- or tetrachlorobenzenes.

Aqueous preparations can be made up as emulsion concentrates, pastes or wettable powders, which can be prepared for use by the addition of water. As emulsifying or dispersing agents there may be mentioned non-ionic agents, for example, condensation products of ethylene oxide with aliphatic alcohols, amines or carboxylic acids containing a high-chain hydrocarbon radical having about 10 to 30 carbon atoms, such as the condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecyl-mercaptan with 12 molecular proportions of ethylene oxide. Among the anion-active emulsifying agents, which may be used, there may be mentioned the sodium salt of dodecyl alcohol sulfuric acid ester, the sodium salt of dodecyl-benzene sulfonic acid, the potassium or triethanolamine salt of oleic acid or of abietic acid or of a mixture of these acids, or the sodium salt of a petroleum sulfonic acid. As cation-active dispersing agents there may be used guaternary ammonium compounds, such as cetyl-pyridimium bromide or dihydroxyethyl-benzyl-dodecyl-ammonium chloride.

For making dusting or scattering prepartions there may be used as solid carriers talc, kaolin, bentonite, calcium carbonate, calcium phosphate, or carbon, cork meal or wood meal or other materials of vegetable origin.

There may also be incorporated with the herbicidal preparations of this invention the usual additions which improve the dispersion, adhesiveness, resistance to rain or penetrating properties of the preparations. As such additions there may be mentioned fatty acids, resins, glue, casein and, for example, alginates and the like. It is of great advantage to make up the preparations in a granular form.

The herbicidal compounds of this invention are suitable for the selective destruction of weeds growing among crop plants and also for the total killing and destruction of undesired plant growth. The term "weeds" is used in this connection to include undesired plants, that is to say plants previously planted or those growing in the vicinity of growing crop plants.

The following examples illustrate the invention, the parts and percentages being by weight:

*Example 1*

19.5 grams of 1-chlorophenyl-2:4-diisocyanate are dissolved in 100 cc. of acetonitrile, and the solution is run into 250 cc. of an aqueous solution of dimethylamine of 40% strength, while stirring vigorously, during which the temperature rises slightly. The whole is stirred overnight, and then the reaction solution is filtered if necessary, and is evaporated in vacuo. The dry residue is taken up in methylene chloride, dried and evaporated, whereby the originally oily residue slowly solidifies in crystalline form. The crude yield is 26.5 grams of a product melting at 138–139° C. The resulting 1-chloro-2:4-phenyl-bis-(N':N'-dimethyl-urea) is recrystallized from chlorobenzene, and the crystals are washed with hexane and dried. They then melt at 143–144° C.

Analysis.—$C_{12}H_{17}O_2N_4Cl$: Calculated: Cl=12.45, N=19.68. Found: Cl=12.62, N=19.72.

*Example 2*

19.5 grams of 1-chlorophenyl-2:4-diisocyanate are dissolved in 100 cc. of acetonitrile, and the solution is added dropwise to 250 cc. of an aqueous solution of monomethylamine of 40% strength, while stirring vigorously. The temperature rises to about 45° C. The condensation product separates out. After stirring the mixture for a further 4 hours, the resulting 1-chloro-2:4-phenyl-bis-(N'-methyl-urea) is filtered off with suction and dried in vacuo. The crude yield amounts to 24 grams of a product melting at 241–243° C. The urea is dissolved hot in dimethylformamide, water is added and the whole is allowed to stand. The condensation product that separates out is filtered off with suction and dried in vacuo. It melts at 241° C.

*Example 3*

20 parts of the urea derivative obtained as described in Example 1 and 80 parts of talc are very finely ground in a ball mill. The resulting mixture is useful as a dusting powder.

*Example 4*

20 parts of the urea derivative obtained as described in Example 2 are dissolved in a mixture of 48 parts of diacetone-alcohol, 16 parts of xylene and 16 parts of a condensation product of ethylene oxide with higher fatty acids, for example, the condensation product of soya bean fatty acid with 30 mols of ethylene oxide. The resulting concentrate can be diluted with water to give an emulsion of any desired concentration.

*Example 5*

20 parts of the urea derivative prepared as described in Example 1 are mixed with 4 parts of a wetting agent, for example, the sodium salt of butylnaphthalenesulfonic acid, 1–3 parts of a protective colloid, for example sulfite cellulose waste liquor, and 15 parts of an inert solid carrier, such as kaolin, chalk or kieselguhr, and the mixture is then finely ground. The wettable powder so obtained can be stirred with water to give a suspension ready for use.

*Example 6*

10 parts of the urea derivative obtained as described in Example 2 are dissolved in 90 parts of coal tar oil, diesel oil or spindle oil.

*Example 7*

10 grams of the compound obtained as described in Example 1 are mixed with 2 grams of sulfite cellulose waste liquor and 100 cc. of water, and the mixture is then subjected to intense grinding, whereby a stable dispersion having a fine state of division is obtained.

*Example 8*

80 parts of the compound obtained as described in Example 1 are mixed with 16 parts of kaolin and 4 parts of an emulsifier marketed under the trademark "Toximul MP" by Ninol Inc., Chicago. The mixture is useful as a wettable powder for spraying.

*Example 9*

Flowerpots were filled with earth in the greenhouse and sown with seeds of the following plants: *Avena sativa, Sorghum sudanense, Dactylis glomerata, Sinapis alba, Pisum sativum, Anthriscus cerefolium* and *Calendula chrysantha*. The earth was watered and its surface was treated on the day of sowing with a dispersion of the preparation described in Example 7. The dispersion was applied at the rate of 10 kg. of active substance per hectare. 3 to 4 weeks after sowing all the test plants had been wholly or almost wholly destroyed.

*Example 10*

Flowerpots were prepared in a manner analogous to that described in Example 9. 10–14 days after sowing the plants were treated with a dispersion described in Example 1 at the rate of 1 kg. of active substance per hectare. As the active substance was also taken up by the leaves, all the test plants were wholly or almost wholly destroyed 11 days after the treatment.

Example 11

Tomato and bean plants were planted in a greenhouse. When the tomatoes had reached a height of 20 cm. and the bean plants had begun to unfold their first three foliated leaves, only the leaves of the plants were sprayed with a dispersion of 0.6% strength of the preparation described in Example 7. 8 days after the treatment the test plants had been completely destroyed.

Example 12

A field was freed from all annual weeds, and was then sown with the following test plants: *Triticum vulgare, Avena sativa, Setaria italica, Allium cepa, Cannabis sativa, Brassica rapa, Sinapis alba, Raphanus raphanistrum, Linum usitatissimum, Soja max., Trifolium pratense, Trifolium repens, Pisum sativum, Beta vulgaris, Daucus carota, Spinacia oleracea* and *Lactuca sativa*. On the day of sowing the field was sprayed with a dispersion prepared with the wettable powder described in Example 8 at the rate of 10 kg. of active substance per hectare. 4 weeks after the sowing all the test plants had been wholly or approximately wholly destroyed. As the active substance is also taken up by the leaves, the same result was obtained by treating the test field when the plants had developed, that is to say 4 weeks after sowing.

What is claimed is:

1. A method for destroying weeds which comprises applying to the area where the weeds are growing a herbicidal amount of an aromatic carbamic acid amide corresponding to the formula

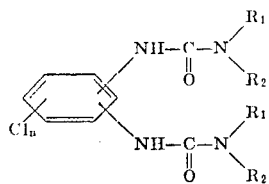

in which $R_1$ represents a member of the group consisting of hydrogen and lower alkyl, $R_2$ represents lower alkyl, and $n$ is a whole number of at the most 2.

2. A method for destroying weeds which comprises applying to the area before the weeds are growing a herbicidal amount of an aromatic carbamic acid amide corresponding to the formula

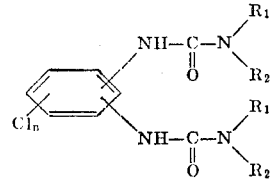

in which $R_1$ represents a member of the group consisting of hydrogen atom and lower alkyl, $R_2$ represents lower alkyl, and $n$ is a whole number of at the most 2.

3. A method as claimed in claim 1 wherein there is applied the compound of the formula

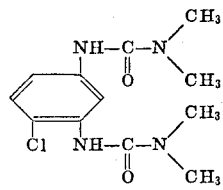

4. A method as claimed in claim 1 wherein there is applied the compound of the formula

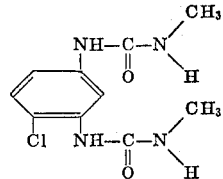

5. A method as claimed in claim 2 wherein there is applied the compound of the formula

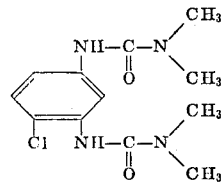

6. A method as claimed in claim 2 wherein there is applied the compound of the formula

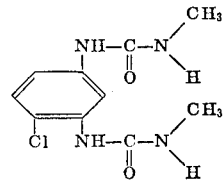

References Cited by the Examiner

UNITED STATES PATENTS

| | | | |
|---|---|---|---|
| 2,655,446 | 10/53 | Todd | 71—2.6 |
| 2,655,447 | 10/53 | Todd | 71—2.6 |
| 2,993,044 | 7/61 | Applegath et al. | 260—553 XR |

JULIAN S. LEVITT, *Primary Examiner.*

LEWIS GOTTS, *Examiner.*